Patented June 1, 1937

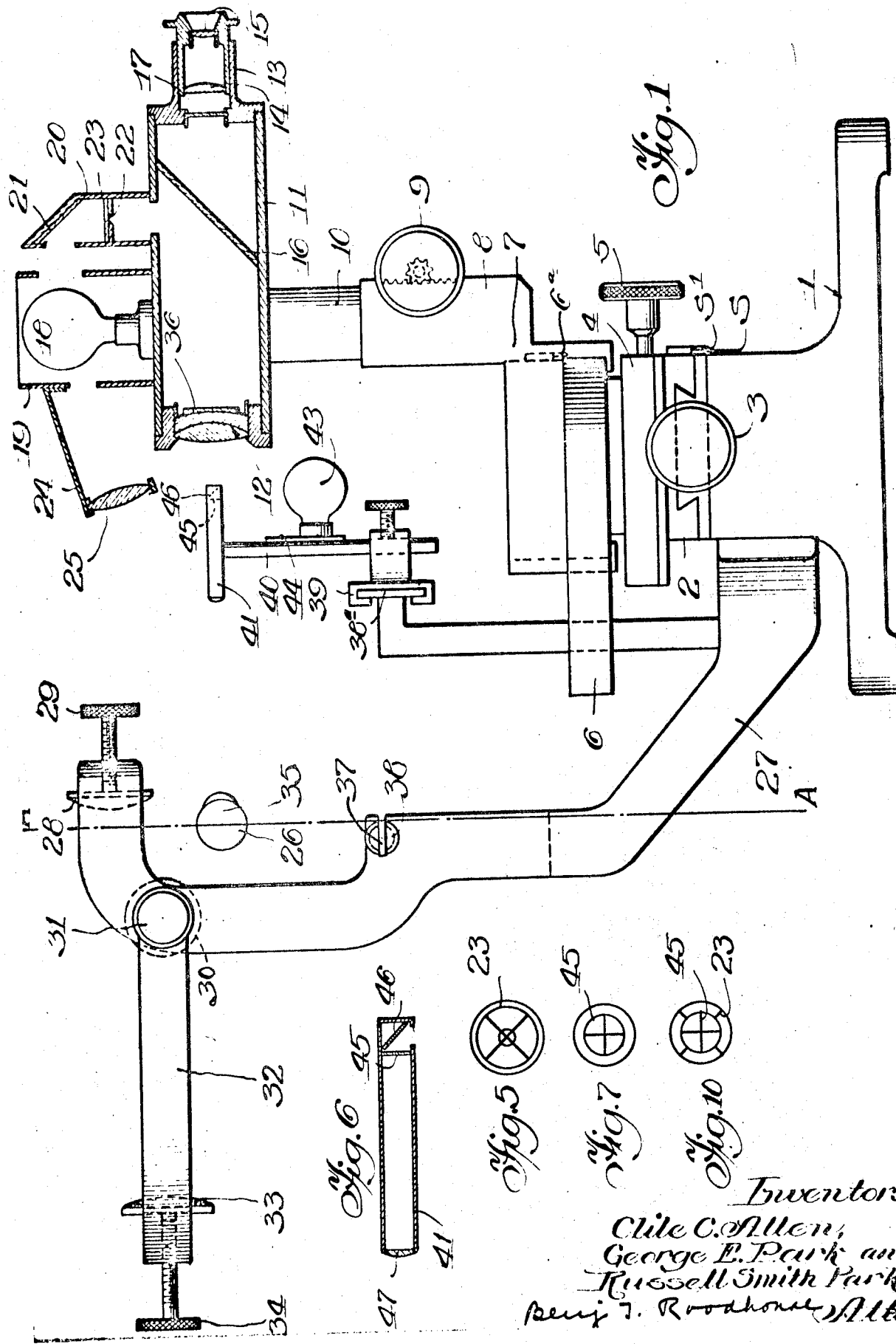

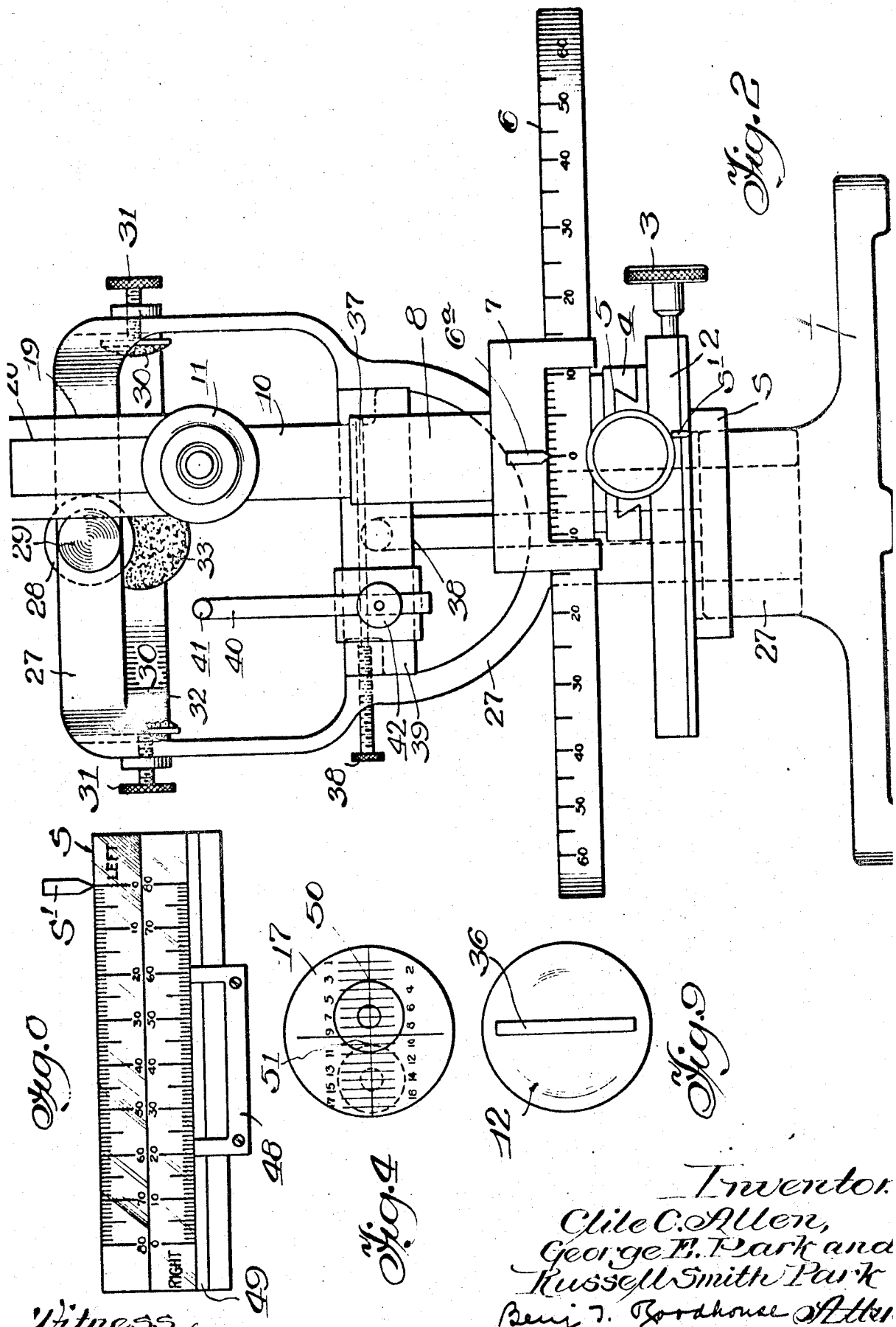

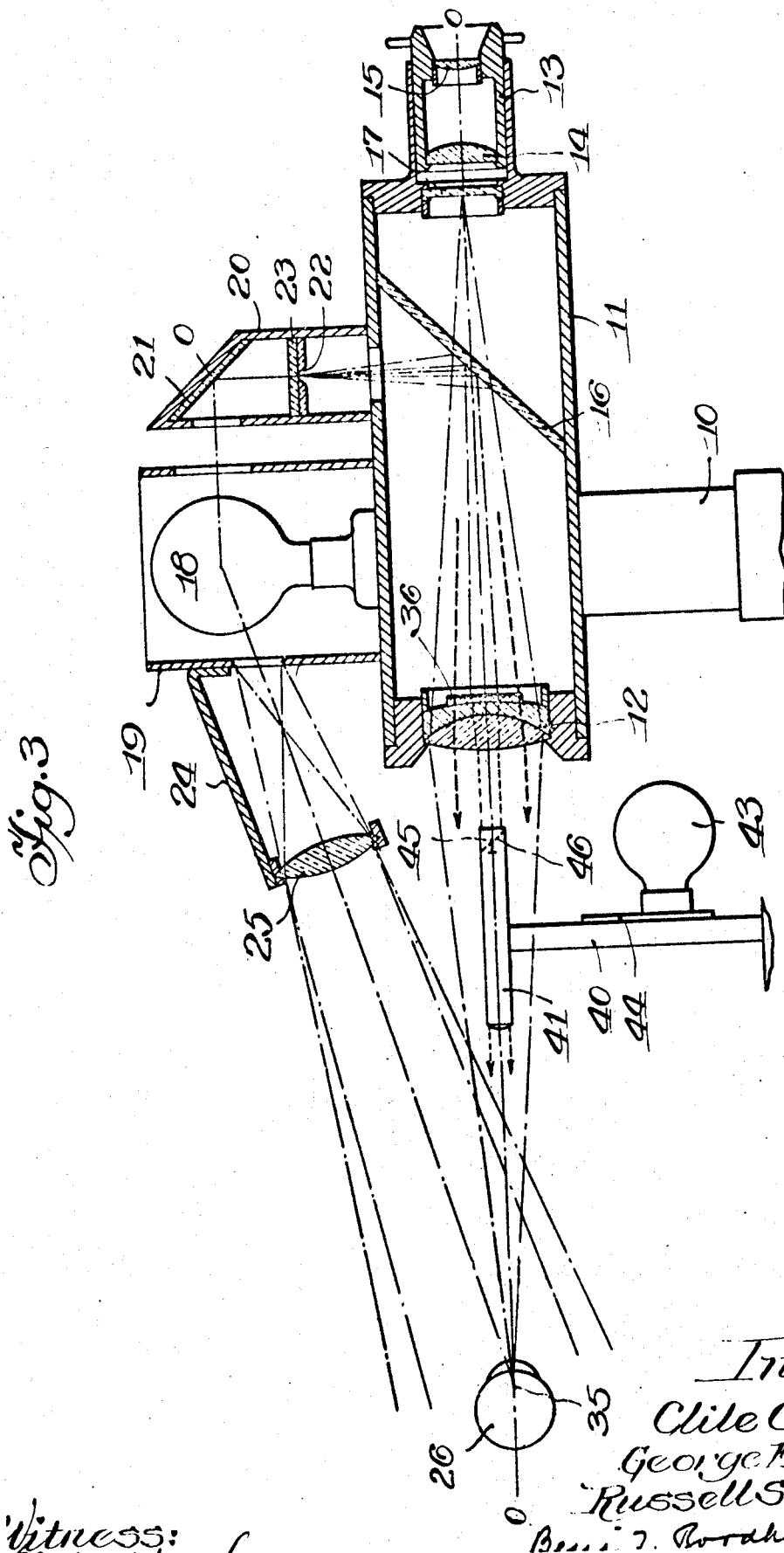

2,081,969

UNITED STATES PATENT OFFICE 2,081,969

INSTRUMENT FOR EXAMINING THE EYES

Cille C. Allen and George E. Park, Chicago, Ill., and Russell Smith Park, Richmond, Ky.

Application July 3, 1933, Serial No. 678,852
Renewed December 14, 1936

11 Claims. (Cl. 88—20)

Our invention relates more particularly to improvements in instruments for determining those factors necessary for the diagnosis and treatment of strabismus. Such factors include the strength of each of the rectimuscles, the angular relation of the visual axes of the eyes, the separation of the visual axes of the eyes, and the angular relation of the optic and visual axes of the eyes, or the determination of the angle alpha.

The human eye, optically, consists of the cornea having a radius of curvature of about 8 millimeters, the crystalline lens having an anterior radius of curvature of about 10 mm. and a posterior radius of curvature of about 6 mm., and the retina at which an image is formed by the action of the cornea and the crystalline lens. Between the cornea and the crystalline lens is the aqueous humor within which the iris moves over the anterior lens surface, the vitreous humor filling the space between the crystalline lens and the retina. The first and second nodal, or principal, points of the eye lie .75 mm. and .36 mm., respectively, anterior to the posterior lens surface. The separation of these points is relatively small, about .4 mm., and they are usually considered as one point located .4 mm. anterior to the posterior lens surface. No appreciable error results from so doing. The lens surfaces are practically spherical while the corneal surface is an ellipsoid, the axis of which usually lies at an angle to the visual axis. The axis of the ellipsoidal corneal surface is the optic axis of the eye and the corneal surface before the pupil is eccentrically disposed relative to the visual axis. The angle subtended by the optic and visual axes is the angle alpha which is positive when the optic axis meets the retina at a point between the macula and the optic disc and is negative when said optic axis meets the retina at a point opposite the optic disc from the macula. The optic and visual axes each pass through the nodal point. It has been found by use of the instrument described in application No. 576,572, now Patent No. 1,953,738, that the visual axis always passes through a point about 13.8 mm. posterior to the corneal vertex during any lateral excursion of a normal eye. This factor is used in the present invention as the point about which angular measurements of the normal eyes are made. This we accomplish by means of a telescope, arranged with an illuminated target, and so positioned relative to the corneal vertex as to project an image of said target to a position 8 mm. posterior to the corneal vertex, and said position is the first conjugate focal plane of the telescope objective. As light rays forming said image are converging to the center of curvature of the corneal surface they are incident at normal to the corneal surface and are partially reflected back along their incident paths to the telescope objective by which they are refracted to form an image at the second conjugate focal plane of the objective, at which plane is positioned a graduated reticule at which said image and said reticule are simultaneously observed through an eye-piece by the observer. Means are provided for moving said telescope along its optic axis until said image is observed to lie at the plane of said reticule which insures the described relation at the corneal vertex. A graduated arc is arranged to move in conjunction with said telescope along its optic axis and said arc is so positioned relative to said telescope that a perpendicular to the plane of the arc and erected from the center of generation of the arc intersects the optic axis of the telescope at a point 13.8 mm. posterior to the corneal vertex when the described relation of the telescope to the corneal vertex has been established for an eye of normal dimensions as described. Where an eye is of greater or less than normal dimensions the corneal radius of curvature is proportionately greater or less, respectively, and the described relation of the telescope to the corneal vertex properly positions the projected arc center for that particular eye. This position of the projected arc center is the point about which angular measurements of the eye are made.

One object of the invention is to provide means for securing the patient's head in a fixed position during the examination.

Another object of the invention is to provide means for measuring the strength of each of the rectimuscles.

A further object of the invention is to provide means for measuring the angular amount of any departure from a condition of parallelism of the visual axes of the eyes.

A further object of the invention is to provide means for measuring the angle between the optic axes of the eyes.

A further object of the invention is to provide means for measuring the angle alpha of each eye.

A further object of the invention is to provide means for measuring the separation of the visual axes of the eyes relative to a condition of parallelism.

A further object of the invention is to provide means for determining such factors which will serve to indicate the amount and kind of operative procedure in cases of strabismus.

A further object of the invention is to provide means for determining the strength of prism or prisms to be prescribed in order to secure binocular vision.

We have attained the foregoing objects by means of the structure illustrated in the accompanying drawings, in which—

Fig. 1 is a schematic illustration, partially in section, of a side elevation of a structure embodying our invention.

Fig. 2 is a schematic end elevation of the structure shown in Fig. 1.

Fig. 3 is a schematic diagram, to an enlarged scale, of the details of projection employed in illuminating the eye and projecting an image for reflection from the corneal surface of the eye and viewing the reflection of said image, while at the same time permitting the eye under examination to focalize the target.

Fig. 4 is a detail of the reticule disposed in the operator's viewing field.

Fig. 5 is a detail of the target projected upon the corneal surface.

Fig. 6 is a detail of the apparatus for supplying a supplementary target to fix the direction of the patient's vision.

Fig. 7 is a detail of the supplementary target.

Fig. 8 is a detail of the scale for measuring relations between the respective eyes.

Fig. 9 is a rear elevational detail of the lens for projecting the image upon the cornea with the element for permitting the patient to see the target.

Fig. 10 is a detail of the combined telescope and supplementary target viewed by the patient.

Similar reference characters are used to designate similar portions throughout the respective views.

As will hereafter be seen our instrument provides facilities for the focalization and viewing of a target by the patient. When the patient reports his vision of the target to be centrally disposed in the lateral meridian of the instrument, and his eye is observed to be centrally disposed with relation to the vertical meridian, the lens system of the instrument is then disposed upon the visual axis of the patient and this provision, with respect to the eye, or these provisions with respect to both eyes, are the basis of the subsequent measurements for the taking of which the instrument was designed.

As will also be hereafter seen, the instrument illuminates the eye so that it may be viewed through the telescope and, at the same time, permits the projection of an image for reflection from the corneal surface and the observance of the reflection of such projected image. In order to accomplish this result we have provided an objective, a central area whereof is modified so as to secure the emergence from the lens of parallel rays radiating from the target so that the patient's eye may see the target throughout the central modified area, while, at the same time, the unmodified area of the objective is available for the formation and viewing of the image of the target reflected at the corneal surface.

In the drawings Fig. 1 is a sectional side view of one embodiment of our invention. Fig. 2 is taken from the right of Fig. 1.

Upon the upward projection of the base 1 is attached the slide 2, actuated by the wheel 3. The slide 4, actuated by the wheel 5, is attached to the slide 2 at 90° thereto. An arc 6, graduated in degrees from zero at its center toward each end, is so attached to the slide 4 that the zero graduation is centrally disposed relative to the slide 4. A perpendicular plane erected through the center of generation of the arc and its zero graduation is parallel to the direction of movement of the slide 4. A member 7, which is carried by the slide 4 and which is provided with a shoe resting upon and is adapted to move about the arc 6 and the position of the pointer 6a relative to the graduations indicates the angular position of the member 7. At the observer's end of the member 7 is erected the tubular member 8 which carries a spur gear on the pinion of the wheel 9, said spur gear acting in conjunction with a rack in the member 10. Revolution of the wheel 9 will elevate or depress the member 10 which will elevate or depress the tubular telescope housing 11 attached to the member 10. The light bulb 18 is attached to the housing 11 and is enclosed in the housing 19. Light passing through an opening in said housing 19 is admitted to the lens 25, supported by the bar 24, said lens 25 serving to illuminate the eye 26 of the patient. The telescope within the housing 11 consists of the objective 12, whose anterior conjugate focus lies at 35 and whose posterior conjugate focus lies at the reticule 17, shown in Fig. 4. Said reticule is suitably marked with a lateral and a vertical line 90° apart which intersect at the optic axis 0—0 of the telescope. A series of numbered graduations extend along said lateral line as shown. An eye-piece 13, consisting of the lenses 14 and 15, is so positioned that the observer may clearly see said reticule in conjunction with an image formed at the posterior conjugate focus of the objective 12 and may also clearly observe the eye movement relative to said graduations of said reticule. At the observer's side of the housing 19 is a second opening which permits light to enter the opening in the housing 20 where it is reflected by the mirror 21 to illuminate the opening 22. At said opening 22 is located a circular target 23 so marked that the patient's attention may be directed to its center as, for example, the crossed lines and the central circle shown in Fig. 5. Light from the target 23 is reflected at the first surface of the transparent parallel plate 16 toward the objective 12 which refracts said light to form an image of the target 23, at 35, as the axial separations of the target 23 and the reticule 17 from the objective are equal. When the position of 35 posterior to the corneal vertex is that of the radius of curvature of the corneal surface said light will be partially reflected back along its incident direction to the objective 12 which will form an image of said corneal reflection at the reticule 17 as previously explained. The aforementioned reflection at the first surface of the plate 16 is secured by forming said plate of a suitable shade of dark glass of such density of shade as to substantially render partial reflection at the second side of said plate invisible to the patient, by which means the patient observes the target 23 as a single target instead of two overlapping targets, as would be the case were a clear plate 16 used. Said density of shade of the plate 16 transmits sufficient light to enable the observer to clearly observe the ocular movements and the corneal reflection at the reticule 17.

Attached to the inner surface of the objective 12, preferably by optical cement, is the rectangular lens 36 of substantially such negative power as to cause light from the target 23 to emerge from the objective 12 as parallel light, as shown by dotted lines in Fig. 3, by which means the patient clearly observes the target 23 by light passing through both the lens 36 and the objective 12 while the observer clearly observes the ocular movements and the corneal reflection through that portion of the objective 12 not covered by the lens 36, as shown in Figs. 3 and 9. Said lens 36 is disposed vertically as shown, the length of its shorter sides being such as to substantially confine the visual axis of the patient to the optic axis O—O of the telescope in the lateral plane when both right and left margins of the target 23 are clearly seen by the patient and are not diffused by being seen through any portion of the objective 12 not covered by the lens 36. As strabismus occurs only in the lateral plane the observer may adjust the telescope in the vertical plane by observation without introducing any appreciable error in the lateral plane. In the use of the instrument the patient is seated facing the head support frame 27, attached to the vertical projection of the base 1, and is directed to clamp his teeth upon the wood bit 37, held in position by the screw 38. A pad 30 is contacted with each temple by the screw 31, the pad 28 is contacted with the forehead by the screw 29, and the pad 33 is contacted with the back of the head by the screw 34, the pad 33 being carried by the bow 32 pivoted to the frame 27. With the pointer 6a at zero on the arc the telescope is adjusted vertically by the wheel 9 and laterally by the wheel 3 until the target 23 appears centrally located as described. The arc 6 moves in conjunction with the telescope and is so related thereto that a perpendicular (the dot and dash line in Fig. 1 indicated by reference characters AA) to the plane of the arc erected from the center of generation of the arc intersects the visual axis 13.8 mm. posterior to the corneal vertex when the described relation of the telescope to the corneal vertex is established for an eye having a corneal radius of curvature of 8 mm. The strength of the internal and external rectimuscles is next found by moving the telescope about the arc toward the nasal and temporal sides, respectively, until the eye can no longer fixedly view the target 23 but wavers as is observed by the observer at the telescope. Where the strength of a rectus muscle is so great that a clear view of the pupillary area cannot be secured the method later described for using the arc 6 in conjunction with the reticule 17 may be employed. The angles thus found represent the strength of the internal and external rectimuscles, respectively, expressed in degrees of arc. The visual axis thus established coincides with the optic axis O—O of the telescope. The optic axis is next found by first locating the pointer 6a at zero on the arc and next moving the supplementary target tube 41 to position before the eye by moving the carrier member 39 along the flat bar 38a and adjusting the height by movement of the post 40 until the target 45 of the tube 41 is seen by the patient to be centrally disposed relative to the target 23, as shown in Fig. 10, as seen by the concentric relation of the rings of the targets.

Fig. 6 is a sectional view of the tube 41 in which the lens 47 is positioned its focal length from the target 45, marked with a lateral and vertical line 90° apart, as shown in Fig. 7. The mirror 46 acts to reflect light from the light bulb 43 upon the target 45. The light shield 44 is disposed to prevent direct light from the light bulb 43 from reaching the eye of the patient. While the patient views the target 45, the telescope is moved to one or the other side of the zero graduation on the arc, depending on whether the angle alpha is positive or negative, until the corneal reflection of the target 23 is seen centrally disposed on the central vertical line of the reticule 17. Said corneal reflection will not fall on the central lateral line of the reticule 17 by reason of the eccentric relation of the corneal surface to the visual axis. The angle indicated by the pointer 6a is the angle subtended by the optic and visual axes at the nodal point of the eye, and is the angle alpha.

Fig. 8 shows the scale S for showing the movement secured through the manipulation of the slide 2 in detail. This scale is used for measuring the separation of the visual axes of the eyes and consists of graduations in millimeters numbered each ten degrees as shown. The eye having the greatest acuity of vision is preferably first examined and the zero graduation for that eye, right or left, is brought to coincide with the pointer S1. Such movement is provided by two spring arms of the number 48 which engage the groove 49 of the scale. The arc 6 and the telescope are next brought before the second eye by the wheel 3. If this eye passes sufficient visual acuity the first eye is covered and the procedure described followed in establishing coincidence of the visual axis with the optic axis of the telescope and in measuring the strength of the rectimuscles. The pointer S1 now indicates the separation of the visual axes. As the angle alpha is practically always of equal amount in each eye it has not been found necessary to measure this angle in the second eye. The strength of the rectimuscles having been determined and the separation of the visual axes found as described, the tube 41 is retained before the first eye, now uncovered, and the telescope before the second eye is moved along the arc until the described coincidence of the targets 23 and 45 occurs. This coincidence has been established in the first eye by viewing both targets simultaneously with that eye. In examining the second eye this eye views the target 45 while the first eye views the target 23. As these targets are dissimilar no stimulation of the fusion faculty occurs and their coincidence occurs only at the angle of deviation between the eyes, when the pointer 6a will indicate the angle of deviation between the eyes. Where the visual acuity of the second eye is insufficient for the procedure described the tube 41 is maintained before the first eye as described and the optic axis determined in the second eye as described by which means the pointer S1 will indicate the separation of the visual axes. The angle indicated by the pointer 6a less the angle alpha is now the angle of deviation between the visual axes when said angle alpha is positive. When said angle alpha is negative the angle indicated by the pointer 6a plus the angle alpha is the angular deviation between the visual axes.

In exceptional cases the deviating eye may pass sufficiently under the inner canthus to preclude the described views of the corneal reflections. In such cases the patient is directed to look toward the templeward side of the deviating eye and simultaneously following such movement with the telescope until an angle, as indicated by the pointer 6a, is reached where the pupillary circle may be easily viewed through the telescope. Said angle indicated by the pointer 6a is noted as well as the position of the corneal margin at its temporal side relative to the scale of the reticule 17, for example, at 3 as indicated by 50 in Fig. 4. The patient is now directed to again look at the target 45 which will again bring the corneal vertex and possibly the pupillary circle entirely beneath the inner canthus. The extent of the movement of said temporal side of said corneal margin is noted, for example said margin has moved from the graduation 3 to the graduation 10 on the reticule as indicated in Fig. 4 from 50 to 51. This graduation difference of seven in the illustration noted furnishes a factor by which the angular amount of such movement may be computed, or, preferably, drawn from a table previously computed. The angle of deviation between the eyes is thus the sum of the angle noted on the arc and the angle through which the corneal margin has moved.

From the foregoing it will be seen that we have provided means for determining those factors necessary in determining the strength of prism or prisms to be prescribed so that binocular vision may be secured where each eye possesses sufficient visual acuity, and, further, that said factors, together with known anatomical factors of the rectimuscles, provide means for determining the amount and kind of operative procedure to be followed.

Having described our invention what we claim as new and desire to secure by Letters Patent is:

1. In an instrument of the class described, means for securing the head of the patient in a fixed position, an illuminated target and an objective, means for projecting an image of said target to the first conjugate focal plane of said objective, means for positioning said focal plane posterior to and separated from the corneal vertex a distance equal to the radius of curvature of the corneal surface, a graduated reticule positioned at the second conjugate focal plane of said objective, and means for viewing at the plane of said reticule the image of said projected image reflected at said corneal surface.

2. In an instrument of the class described, means for securing the head of the patient in a fixed position, an illuminated target and an objective, means for projecting an image of said target to the first conjugate focal plane of said objective, means for positioning said focal plane posterior to and separated from the corneal vertex a distance equal to the radius of curvature of the corneal surface, a graduated reticule positioned at the second conjugate focal plane of said objective, means for viewing at the plane of said reticule the image of said projected image reflected at said corneal surface, and means for bringing the vertical plane of the optic axis of said objective to coincide with the visual axis of the eye.

3. In an instrument of the class described, means for securing the head of the patient in a fixed position, an illuminated target and an objective, means for projecting an image of said target to the first conjugate focal plane of said objective, means for positioning said focal plane posterior to and separated from the corneal vertex a distance equal to the radius of curvature of the corneal surface, a graduated reticule positioned at the second conjugate focal plane of said objective, means for viewing at the plane of said reticule the image of said projected image reflected at said corneal surface, and means for determining the angular relation of the optic axis of the eye relative to said visual axis.

4. In an instrument of the class described, means for securing the head of the patient in a fixed position, an illuminated target and an objective, means for projecting an image of said target to the first conjugate focal plane of said objective, means for positioning said focal plane posterior to and separated from the corneal vertex a distance equal to the radius of curvature of the corneal surface, a graduated reticule positioned at the second conjugate focal plane of said objective, means for viewing at the plane of said reticule the image of said projected image reflected at said corneal surface, and means for positioning a second illuminated target centrically with respect to said visual axis.

5. In an instrument of the class described, means for securing the head of the patient in a fixed position, an illuminated target and an objective, means for projecting an image of said target to the first conjugate focal plane of said objective, means for positioning said focal plane posterior to and separated from the corneal vertex a distance equal to the radius of curvature of the corneal surface, a graduated reticule positioned at the second conjugate focal plane of said objective, means for viewing at the plane of said reticule the image of said projected image reflected at said corneal surface, a graduated arc, and means for positioning the center of generation of said arc at a fixed position relative to said first conjugate focal plane.

6. In an instrument of the class described, means for securing the head of the patient in a fixed position, an illuminated target and an objective, means for projecting an image of said target to the first conjugate focal plane of said objective, means for positioning said focal plane posterior to and separated from the corneal vertex a distance equal to the radius of curvature of the corneal surface, a graduated reticule positioned at the second conjugate focal plane of said objective, means for viewing at the plane of said reticule the image of said projected image reflected at said corneal surface, and means for determining the separation of the visual axes of the eyes.

7. In an instrument of the class described, means for securing the head of the patient in a fixed position, an illuminated target and an objective, means for projecting an image of said target to the first conjugate focal plane of said objective, means for positioning said focal plane posterior to and separated from the corneal vertex a distance equal to the radius of curvature of the corneal surface, a graduated reticule positioned at the second conjugate focal plane of said objective, means for viewing at the plane of said reticule the image of said projected image reflected at said corneal surface, and means for determining the angular relation of the visual axes of the eyes.

8. In an instrument of the class described, means for securing the head of the patient in a fixed position, an illuminated target and an objective, means for projecting an image of said target to the first conjugate focal plane of said objective, means for positioning said focal plane posterior to and separated from the corneal vertex a distance equal to the radius of curvature of the corneal surface, a graduated reticule positioned at the second conjugate focal plane of said objective, means for viewing at the plane of said reticule the image of said projected image reflected at said corneal surface, and means for determining the angular relation of the optic axes of the eyes.

9. In an instrument of the class described, means for securing the head of the patient in a fixed position, an illuminated target and a telescope, said target centrically positioned on the optic axis of said telescope at the second conjugate focal plane of the objective of said telescope and so formed as to identify said optic axis, means for projecting an image of said target to the first conjugate focal plane of said objective, means for positioning said first conjugate focal plane posterior to and separated from the corneal vertex a distance equal to the radius of curvature of the corneal surface, a graduated reticule centrically positioned on said optic axis at said second conjugate focal plane and so formed as to identify said optic axis, means for viewing at the plane of said reticule and in conjunction therewith the image of said projected image reflected at said corneal surface, a lens, said lens optically centered on said optic axis and positioned adjacent to said objective, of lesser area than said objective, and of such negative power that said target lies at the principal focus of the lens system consisting of said lens and said objective.

10. In an instrument of the class described, means for securing the head of the patient in a fixed position, an illuminated target and a telescope, said target centrically positioned on the optic axis of said telescope at the second conjugate focal plane of the objective of said telescope and so formed as to identify said optic axis, means for projecting an image of said target to the first conjugate focal plane of said objective, means for positioning said first conjugate focal plane posterior to and separate from the corneal vertex a distance equal to the radius of curvature of the corneal surface, a graduated reticule centrically positioned on said optic axis at said second conjugate focal plane and so formed as to identify said optic axis, means for viewing at the plane of said reticule and in conjunction therewith the image of said projected image reflected at said corneal surface, a lens, said lens optically centered on said optic axis and positioned adjacent to said objective, of lesser area than said objective, and of such negative power that said target lies at the principal focus of the lens system consisting of said lens and said objective, and means for viewing said target by said patient simultaneously with said viewing of said reflected image at the plane of and in conjunction with said reticule by the observer.

11. In an instrument of the class described, means for securing the head of the patient in a fixed position, an illuminated target and a telescope, said target centrically positioned on the optic axis of said telescope at the second conjugate focal plane of the objective of said telescope and so formed as to identify said optic axis, means for projecting an image of said target to the first conjugate focal plane of said objective, means for positioning said first conjugate focal plane posterior to and separate from the corneal vertex a distance equal to the radius of curvature of the corneal surface, a graduated reticule centrically positioned on said optic axis at said second conjugate focal plane and so formed as to identify said optic axis, means for viewing at the plane of said reticule and in conjunction therewith the image of said projected image reflected at said corneal surface, a lens, said lens optically centered on said optic axis and positioned adjacent to said objective, of lesser area than said objective, and of such negative power that said target lies at the principal focus of the lens system consisting of said lens and said objective, and means for viewing said target by said patient simultaneously with said viewing of said reflected image at the plane of and in conjunction with said reticule by the observer, a graduated arc, means for positioning a projection of the center of generation of said arc to intersect said optic axis, and means for maintaining said intersection during all movements of said telescope along said arc.

CLILE C. ALLEN.
GEORGE E. PARK.
RUSSELL SMITH PARK.